(12) United States Patent
Nelson

(10) Patent No.: US 6,935,958 B2
(45) Date of Patent: Aug. 30, 2005

(54) METHOD AND APPARATUS FOR MACHINE LOCATION

(75) Inventor: Dwayne Nelson, Las Vegas, NV (US)

(73) Assignee: IGT, Reno, NV (US)

( * ) Notice: Subject to any disclaimer, the term of this patent is extended or adjusted under 35 U.S.C. 154(b) by 372 days.

(21) Appl. No.: 10/072,222

(22) Filed: Feb. 6, 2002

(65) Prior Publication Data

US 2003/0130039 A1 Jul. 10, 2003

(51) Int. Cl.$^7$ ............................................. A63F 13/00
(52) U.S. Cl. ......................... 463/42; 463/31; 463/25; 463/40; 463/16
(58) Field of Search ............................... 463/48, 40–42

(56) References Cited

U.S. PATENT DOCUMENTS

| | | | | |
|---|---|---|---|---|
| 3,886,553 A | * | 5/1975 | Bates | 342/465 |
| 4,177,466 A | * | 12/1979 | Reagan | 342/456 |
| 4,799,062 A | * | 1/1989 | Sanderford et al. | 342/450 |

(Continued)

FOREIGN PATENT DOCUMENTS

| | | |
|---|---|---|
| WO | WO 98/30297 A1 | 7/1998 |
| WO | WO 01/48713 A1 | 7/2001 |
| WO | WO 01/54091 A2 | 7/2001 |
| WO | WO 01/99067 A2 | 12/2001 |
| WO | WO 02/32517 A2 | 4/2002 |
| WO | WO 02/103586 A1 | 12/2002 |
| WO | WO 03/005743 A1 | 1/2003 |

OTHER PUBLICATIONS

Kilby et al., Casino Operations Management, 1998, John Wiley & Sons, Inc. pp 120–122.*

Wolf et al., A Novel Method for 3–D Position Sensing Using Ultrasonics, 1997.*

Examiner's Affidavit.*

Voronoi Diagrams article.*

Using APRS for Direction Finding.*

Thornton, Electromagnetic Radiation and Direction Finding.*

Versus Technology, Inc., Eagle Eye/Eagle Eye Network; *Turn your access control system into a real–time asset tracking system*; printed: Aug. 2001; pp. 1–8; website: www.versustech.com/eagleeye.html.

SpaceDaily; *Pinpoint Asset Management Via GPS*; published: Oct. 1998; pp. 1–5; website: www.spacer.com/news/gps–98m.html.

*Primary Examiner*—Michael O'Neill
(74) *Attorney, Agent, or Firm*—Beyer Weaver & Thomas, LLP.

(57) ABSTRACT

A method and apparatus for tracking and determining a location of a gaming machine or other item within a casino or hotel is disclosed. In one embodiment the method and apparatus utilizes a transmitter or emitter to provide a tracking signal that may be tracked by one or more receivers or detectors. It is contemplated that the transmitter or emitter connect to a gaming machine. As the gaming machine is relocated within the casino its location is monitored. The one or more receivers may communicate with a host computer or other data processing system to generate location data regarding the gaming machine in relation to other aspects of the casino. Based on the location information generated by the location monitoring and tracking system, other aspects of machine operation may be controlled and additional features dependant on the machine location information may be enabled.

36 Claims, 6 Drawing Sheets

U.S. PATENT DOCUMENTS

| | | | | |
|---|---|---|---|---|
| 4,926,161 A | * | 5/1990 | Cupp | 340/988 |
| 5,027,314 A | * | 6/1991 | Linwood et al. | 701/300 |
| 5,119,104 A | * | 6/1992 | Heller | 342/450 |
| 5,387,993 A | * | 2/1995 | Heller et al. | 398/151 |
| 5,438,518 A | * | 8/1995 | Bianco et al. | 473/407 |
| 5,469,175 A | * | 11/1995 | Boman | 342/357.08 |
| 5,524,081 A | * | 6/1996 | Paul | 701/300 |
| 5,548,637 A | * | 8/1996 | Heller et al. | 379/201.07 |
| 5,572,195 A | * | 11/1996 | Heller et al. | 340/825.49 |
| 5,610,586 A | * | 3/1997 | Zeytoonjian et al. | 340/571 |
| 5,772,534 A | * | 6/1998 | Dudley | 473/407 |
| 6,104,295 A | * | 8/2000 | Gaisser et al. | 340/573.4 |
| 6,104,815 A | | 8/2000 | Alcorn et al. | |
| 6,278,402 B1 | * | 8/2001 | Pippin | 342/357.08 |
| 6,300,903 B1 | * | 10/2001 | Richards et al. | 342/450 |
| 6,705,942 B1 | * | 3/2004 | Crook et al. | 463/3 |

\* cited by examiner

METHOD AND APPARATUS FOR MACHINE LOCATION

FIELD OF THE INVENTION

The present invention relates to gaming and in particular a machine location and tracking system.

BACKGROUND OF THE INVENTION

One common environment for gaming is in a casino. Modern casinos are often large, elaborate structures that may contain numerous different gaming areas with hundreds or thousands of gaming machines. Moreover, the casino will often have one or more restaurants, lounges or bars, event areas, pools, entrances and shopping areas interspersed throughout the casino. It is not uncommon for casinos to also contain family areas or areas containing activities directed to children. Due to the size, configuration, and number of gaming machines within the casino, locating or tracking the various casino areas and machines can be complex and time consuming.

The complexity of finding or tracking the machines within a casino is exasperated by the common practice of casino personnel continually rearranging the location of gaming machines within a casino. For example, it is common for casino personnel to arrange gaming machines to particular location for a special event, such as a slot tournament. It is also common for casino personnel to group certain gaming machines at a particular location during a special event. For example, it may be desired to place large denomination gaming machines near an entrance or exit to a sporting event or other event that will be attended by wealthy gamblers. As a result, gaming machines often change location within a casino. The recurring relocation of gaming machines creates a drawback when attempting to track, monitor, and electronically communicate with the gaming machines.

It is also common for casinos and other gaming establishments to be regulated by authorities. These authorities may comprise a gaming commission or other licensing or regulator agency. The authorities often promulgate regulations that govern the proximity of a gaming machine to certain areas within the casino. The regulations may also control other aspects of game machine operation. By way of example, the regulations may prohibit casino personnel from locating a gaming machine within a minimum distance from an entrance or family area in the casino, or may prohibit operation of a gaming machine after or before certain hours. These regulations, combined with the recurring movement of the gaming machines often creates monitoring difficulties. For example, it is presently expensive, time consuming, and difficult to track the location of each machine in relation to other aspects of the casino. Moreover, it is difficult to physically find a particular machine on the floor and execute electronic communication with a particular machine. For example, different parts of the casino may utilize a different computer network.

For these and other reasons, there is a need for a method and apparatus to locate and track gaming machines, other regulated devices, or other aspects in a casino or other environment. The method and apparatus described herein provides a solution to the needs in the art and enables advanced features and functionality here before unachievably.

SUMMARY OF THE INVENTION

A method and apparatus for machine location and tracking is disclosed. Numerous additional systems and methods derive from the method and apparatus for machine location as described herein. The method and apparatus described may be configured to determine of the location of one or more gaming machines in a casino, building, outdoor environment, or other area. The location may be represented as location data. One or more computing systems may process the location data to related the location to a graphical representation of the machine on a graphical representation of a gaming area or casino.

In one embodiment, a method for locating a gaming machine on a casino floor comprises receiving one or more signals from a tracking device. The tracking device may be located on a gaming machine. Thereafter, processing the one or more signals from the tracking device to determine location data regarding the gaming machine. Then processing the location information in relation to casino floor location information to thereby determine the location of the gaming machine on the casino floor. In one embodiment the method further includes transmitting a signal from the tracking device located on the gaming machine. The signal may be received by a components of the location tracking system. In one embodiment the one or more signals that are processed comprises signals received from at least three different receivers. The signal may comprise an infrared type signal. The tracking device comprises a radio frequency identification tag. In one embodiment, the method further includes generating a representation of the gaming machine on a graphical representation of the casino floor, such as on a computer screen In another embodiment, an apparatus for mapping a casino floor layout in a casino is provided. The apparatus comprises one or more emitters located at one or more locations in the casino and one or more detectors located at one or more locations in the casino. The detectors are configured to detect the emitters. Also included is a communication channel configured to facilitate communication between and a processor connected to the communication channel. The processor may be configured to receive and process data regarding the location of the emitters from the detectors. In one embodiment the emitters generate infrared signals while in another embodiment the detectors generate energy that causes the emitters to emit a signal.

In one embodiment the method further includes a mapping module configured to execute on the processor, the mapping module providing a graphical representation of the location of the one or more emitters. In one embodiment one or more emitters emit a radio frequency signal. The one or more emitters may be further configured to communicate with the processor over a computer network, and a computer network connected to the one or more emitters and the processor The method and apparatus for machine location may also be used to implement a method for synchronizing certain aspects of operation for two or more gaming machines by defining a distance parameter and defining one or more reference gaming machines. A reference gaming machine is defined herein to mean a machine or other location tracked casino device that serves as a control machine or lead machine on which other actions or events are based. Thereafter, analyzing the location of one or more gaming machines in relation to the reference gaming machine and the distance parameter and generating control signals to control operation of certain aspects of gaming machine operation. Thereafter, transmitting the control signals to a subset of the one or more gaming machines, the subset defined at least in part by the distance parameter. This method may be used to control certain aspects of gaming machine operation such as the audio emitted from the gaming machine. Moreover, certain aspects of gaming machine operation may comprise video shown on a gaming machine video screen. In one embodiment the distance parameter comprises data regarding which gaming machines will have certain aspects of the operation synchronized. Transmitting the control signals may occur over a computer network.

In one embodiment a method for monitoring compliance with gaming regulations is provided that comprises receiving gaming machine location data regarding the location of one or more gaming machines and processing the gaming machine location data. Then, comparing the processed gaming machine location data to casino area location data and generating an alert if the comparing reveals that the location of one or more gaming machines are not in compliance with gaming regulations.

In one embodiment the gaming regulation comprise regulations regarding a minimum distance between a gaming machine and an area of a casino. In one embodiment the gaming machine location data is received from a gaming machine tracking system.

In an alternative method of use, a method for locating the position of a player on a casino floor is provided that comprises receiving network address data from a player tracking system regarding which of two or more gaming machines the player is currently playing and accessing a translation table to translate the network address to location data. The location data is processed for relation to the casino floor and provided to one or more casino personnel. In one embodiment processing the location data comprises generating the data into a graphical representation in relation to casino floor. The player tracking system may obtain input from a player to determine when a player is playing. It is contemplated that the translation table may relate a network address to a physical location of a gaming machine on the casino floor.

In yet another embodiment a system for controlling two or more gaming machines upon the occurrence of a winning event is provided. The system comprises a gaming machine location system configured to generate location data regarding a location of two or more gaming machines. Also provided is a computing device configured to control at least one aspect of gaming machine operation, process the location data and the winning event data to generate control signals. Communication apparatus may also be configured to communication control signal between the computing device and the two or more computing devices. In one embodiment the control signals comprise signals that control operation of at least one of the gaming machine audio, gaming machine visual indicators, gaming machine video. In one embodiment the computing device configured to process comprises a computing device configured to processes the location data and the winning event by determining which gaming machines are located within a minimum distance from the gaming machine having the occurrence of the winning event. Note that in one embodiment only gaming machines located within the minimum distance receive the control signals.

It should be noted that although reference is made to a minimum distance, the term minimum distance is used herein only for exemplary purposes. In all the system and embodiments described herein it is fully contemplated that other logic or control methodology may be adopted beside use of a minimum distance when deciding when an action occurs. For example, instead of machines within a minimum distance responding or being manipulated other criteria may be used. These criteria include any location based determination such as, but not limited to, every other machine, every third machine, every forth machine, etc., machines within a bank, opposing machines, adjacent machines, machines on the end or near the middle of a bank, machines facing entrances, machines facing bars and/or restaurants, or any other location based determination.

It is further contemplated that method for highlighting occurrence of a winning event on a gaming machine by causing other proximately located gaming machines to react to the winning event may be embodied using the machine location method and apparatus. One such the method comprise detecting a winning event, the winning event occurring at a first gaming machine. The method may also include processing location data to determine which gaming machines are proximately located to the first gaming machine. Thereafter, generating control instructions to control one or more aspects of one or more proximately located gaming machines and transmitting the control instructions to one or more of the proximately located gaming machines. One embodiment may include comparing the distance between the first gaming machine and other gaming machines to determine which gaming machines are proximately located.

DETAILED DESCRIPTION OF THE INVENTION

The method and apparatus described herein may be configured to locate gaming machines and tracking gaming machine location. On other embodiments, other objects or aspects may be tracked or monitored. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention. Moreover, the features described herein may be implemented or claimed alone or in any combination.

Figure 1:
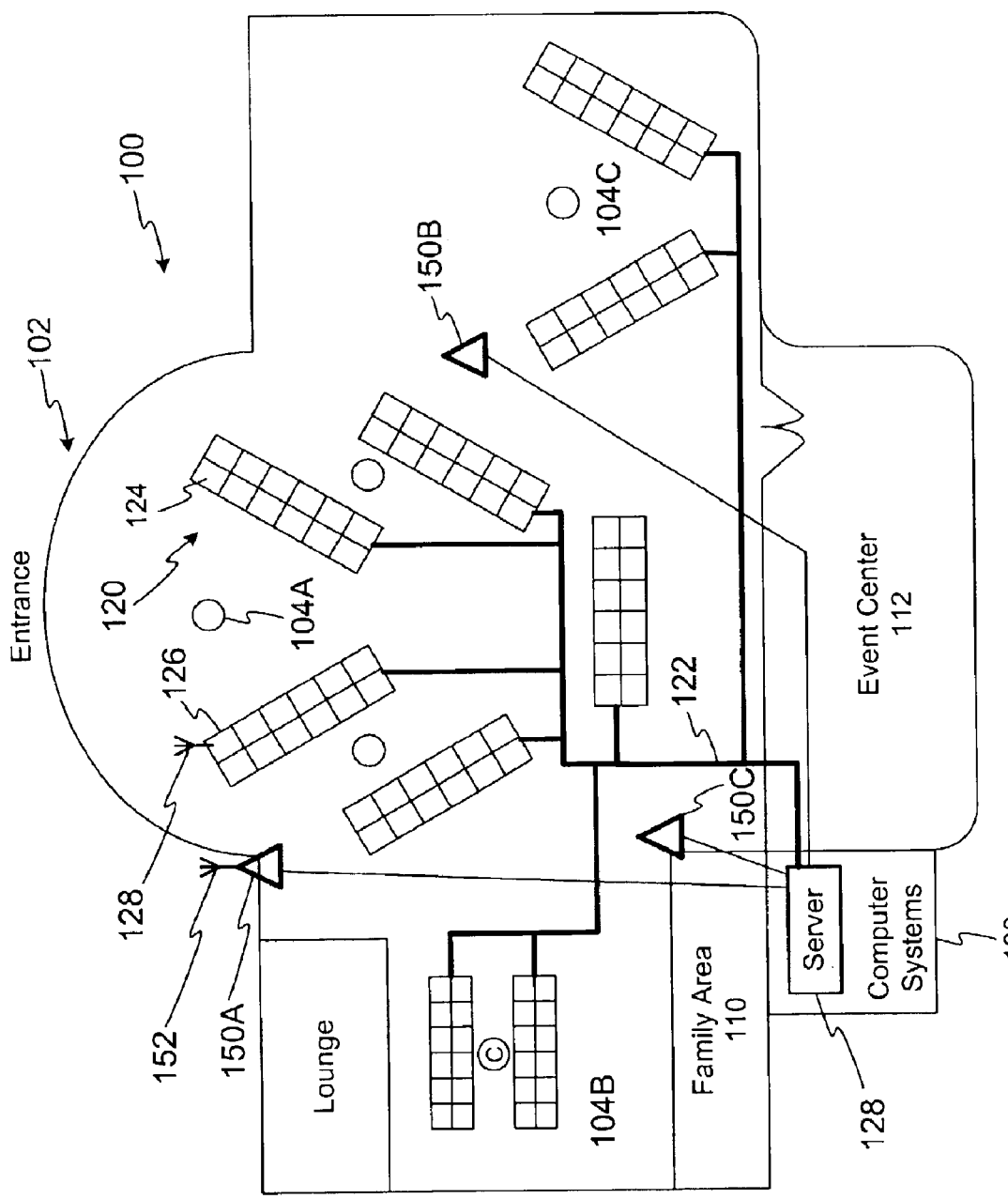
FIG. 1 illustrates one embodiment of the invention in an example environment of a casino.

FIG. 1 illustrates an example embodiment of the invention in an example environment of a casino 100. Although shown in a casino 100, the method and apparatus described herein may be implemented in any location where location or tracking of gaming related devices is desired. As shown, the casino 100 includes an entrance 102, one or more restaurants 106, one or more lounges 108, a family area 110, and a sporting area 112.

It is contemplated that regulations may control how close gaming machines may be placed to the family area 110. The term gaming machines should be interpreted to mean any type device or apparatus configured to provide a gaming experience or aid in gaming. The gaming machines may comprise an electronically or non-electronically controlled or operated slot machine, video poker machine, video pachinko, multi-game machine, keno machine, or any other device or system capable of providing a gaming event. It is contemplated diners in the restaurant 106 will not want to be disturbed by sound from the gaming machines. It is also contemplated that the operating characteristics of the gaming machines near the event center area 112 will often change based on the particular time and performance, entertainment, or event featured in the event center 112.

As would be contemplated in a casino, gaming areas 104A, 104B, and 104C are located on the casino floor. One or more banks 120 of gaming machines 124 reside in each of the gaming areas. The gaming machines 124 that comprise the banks 120 are not permanently fixed in place but may be moved about based on the judgment of casino personnel. As shown, communication medium 122 connect the gaming machines 124 to a host 128 that may be remotely located in a computer systems area 130. Network communication occurs over the communication medium 122 between the gaming machines 124 and the host 128. The communication medium 122 may comprise any medium capable of carrying a signal between one or more points including, but not limited to, fiber optics, metallic conductor cabling, or systems to facilitate wireless or optic communication such as radio frequency communication. The host is described in more detail below in conjunction with FIG. 3. It is contemplated that via communication from the host 128 to the gaming machines various aspects of gaming machine operation may be controlled or modified. This is also discussed below in greater detail.

In this embodiment one or more gaming machine location devices 150A, 150B, and 150C, are located in the casino 100. The gaming machine location devices 150 are configured to provide location information regarding at least one of the gaming machines 124 or the gaming banks 120 to the host 128 or other computer or processing system. Thus, each bank may share a location tracking device, such as an radio frequency transmitter. Any type of location or tracking system be implemented for use with the method and apparatus described herein. In the exemplary embodiment shown in FIG. 1, a triangulation system is implemented. Each of the devices 150A, 150B, and 150C comprises a precision radio transmitter and/or receiver. An base antenna 152 may be included as shown on transceiver device 150A. For purposes of discussion transceiver device 150A is discussed in detail. In one configuration the transceiver 150A generates a signal, as radio frequency energy and transmits the signal over the antenna 152. In another embodiment the transceiver 150A is configured to receive signals from the gaming machines, such as gaming machine 126 with antenna 128. It is contemplated that the transceivers 150A, 150B, and 150C cooperate to offer triangulation capability to determine the location or track the gaming machines 124. Though the use of triangulation systems and other location or tracking systems are described herein, the scope of the claims are not limited to only these methods. The invention encompasses any method for determining the location of one or more gaming device or other items. The location data may then be used as desired. One method of location determination is manual entry of the data.

Figure 2:
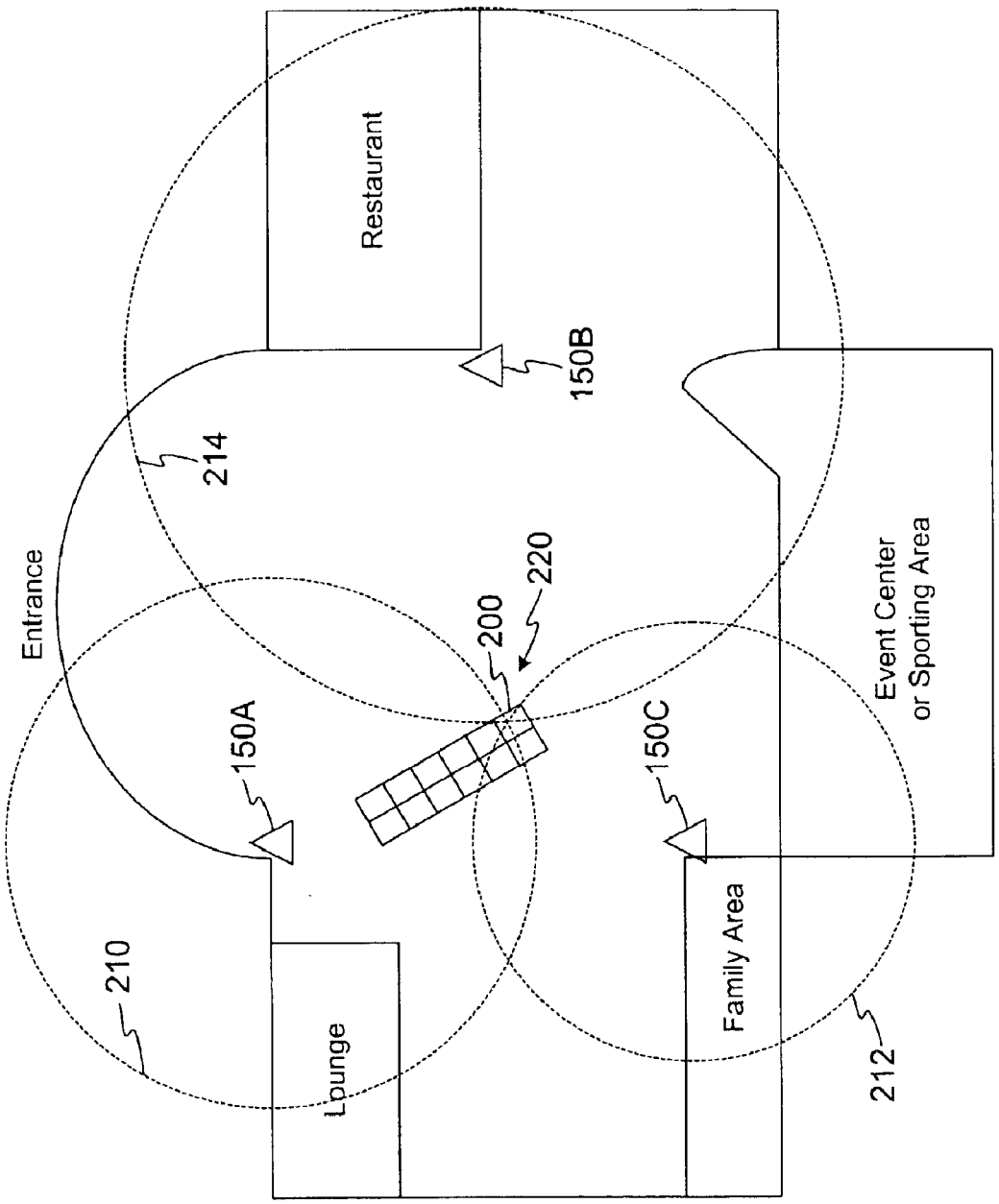
FIG. 2 illustrates an example of triangulation on a gaming machine.

FIG. 2 illustrates an example embodiment of the invention implementing triangulation in an example environment of a casino. To determine the location of a gaming machine 200 a signal is sent from each of the transceivers 150A, 150B, and 150C. Additional transceivers may be utilized other than the three transceivers 150 that are shown. Each transceiver maybe may generate a uniquely identifiable signal. In one configuration the transceiver 150A emits a radio signal that travels at a known rate of propagation. The signal from transceiver 150A may be coded, modulated, or otherwise identifiable, as compared to the transceivers 150B and 150C. The gaming machine 200 monitors for a signal sent from any of the transceivers 150A, 150B, and 150C. The time difference between transmission of the signal from the transceiver 150A and receipt of the signal at gaming machine 200 can be recorded. The time value, between transmission and receipt, multiplied by the rate of propagation of the signal provides the distance of the gaming machine from the transceiver 150A. Propagation circle 210 defines a distance at which the gaming machine could lie based on the rate of propagation. Since each point along the circumference of the propagation circle 210 is equal distance from the transceiver it is known that the gaming machine is located at some point along the propagation circle 210.

Similar principles apply to propagation circle 212 corresponding to the signal generated by transceiver 150C and propagation circle 214 corresponding to the signal generated by transceiver 150B. The location of machine 200 is defined by intersection point 220. Each gaming machine will be identifiable by a different intersection point. In this manner the location of each machine can be determined. Processing may occur in the host computer to extrapolate the location of each gaming machine in relation to each of the other gaming machines or other reference points in the casino. Other items in the casino may also be mapped.

In another embodiment the gaming machine is configured to transmit a signal and each transceiver is configured to receive the transmission from the gaming device. Using similar principles as when the transceiver was transmitting, the location of each gaming machine may be calculated be comparing the time of transmission to the time of receipt. Triangulation can then be used to determine a location of the transmitting gaming machine. In yet another embodiment the transceiver and the gaming machine may both perform iterations of transmit and receive to determine location of a gaming machine.

With regard to reference points, a reference point may comprise a dumb terminal that serves as a boundary point for use by the location system and the graphical software to determine the boundaries of the casino or other building. A reference point may be placed at each corner of the casino to align a graphical representation of the casino layout, such as one in software, with the electronic data received by the reference points. In one embodiment any two reference points that are located at particular points in the casino can be used to align a two dimensional mapping of the casino floor to a graphical representation such as might be stored on a computer.

In another embodiment the method and apparatus described herein is implemented with an infrared or radio frequency reader network used to receive signals or track tracking tags. The tracking tags reside on the gaming machines. The tags are located by a tracking apparatus. This can provide real time location of gaming machines. This type of tracking system may include a TCP/IP connection for integration with existing networks. The monitoring apparatus may reside in a ceiling or other elevated location and be connected to a central location with basic twisted pair cables. One example of such a system is available from Versus Technology, Inc. located in Traverse City, Mich.

In another embodiment the tracking and location system is implemented using local positioning system that operates similar to a Global Positioning System (GPS). While Global Positioning System (GPS) signals may be used, such signals do not presently have the ability to travel through buildings. Through the use of high frequency tags placed on the gaming machines, the machines may be located and tracked by antennas and cell controllers while indoors. The cell controllers calculate the present location of the machines and provide the location information over a network. One example of such a system is available from CheckPoint Corporation located in Thorofare, N.J.

Using the gaming machine location data the initial set-up or configuration of a gaming machine may be controlled. Likewise, subsequent changes may be made to the software or changeable settings of the gaming machine via a network based on the location of the gaming machine. In one embodiment the download of software may be verified or validated based on location. In one embodiment the download of software is based only on location. In one embodiment the download of software is based on both the location of the machine and the configuration. By way of example, machines located in a certain area may receive an updated or modified software version while other machines that are not located in that area do not receive the software. The location data may be used to control which machines are configured in a particular manner. Likewise, inventory control, monitoring, and data collection may be achieved using the location tracking and monitoring systems described herein.

In one embodiment the various aspects of the gaming machine or other gaming device may be tracked. Hence, the term or phrase gaming machine should be interpreted broadly to mean any aspect of the gaming machine. Thus, the processor board, software storage device, or machine housing, machine bank, or any other aspect may be tracked.

Figure 3:
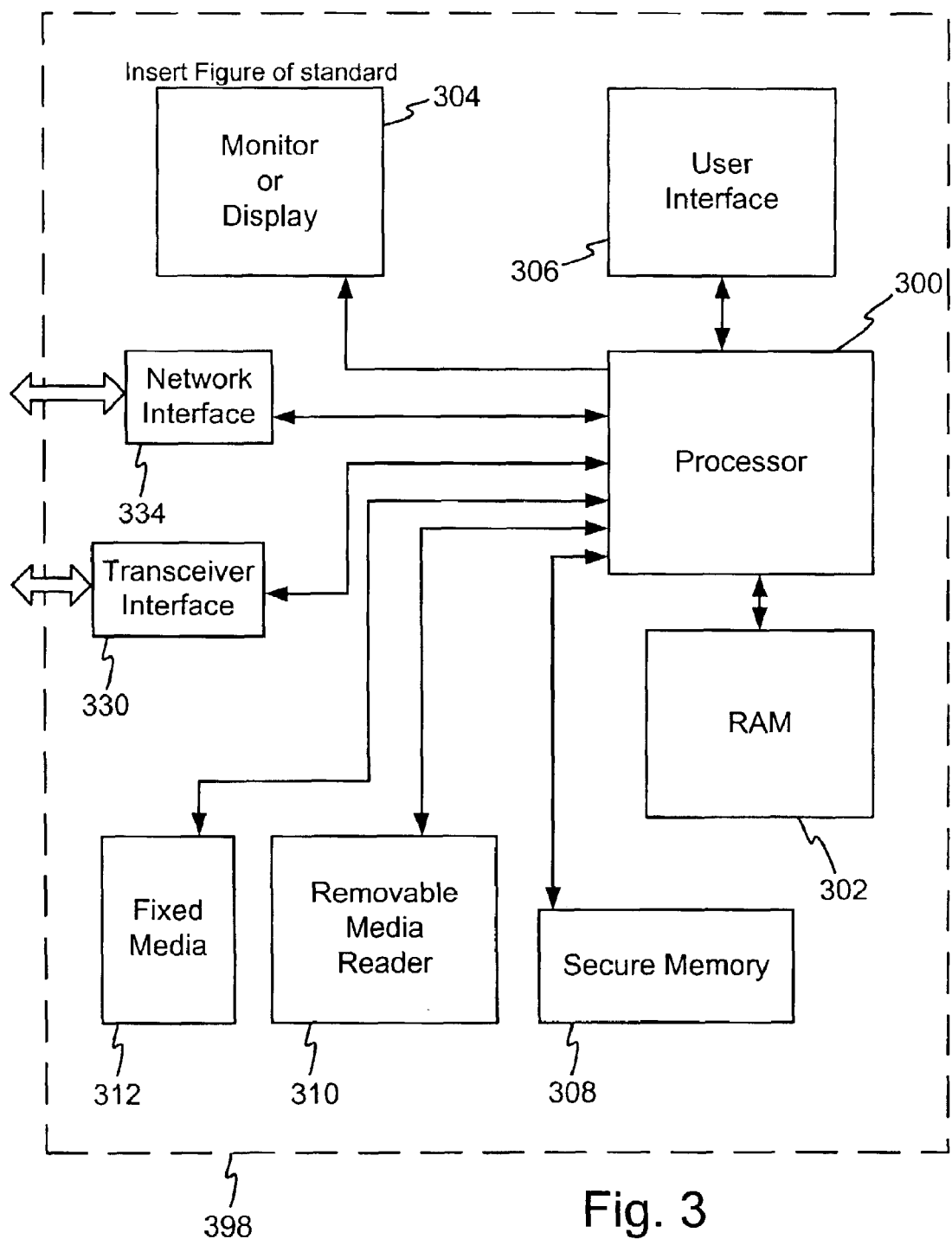
FIG. 3 illustrates a block diagram of an example embodiment of a host.

FIG. 3 illustrates an example embodiment of a host. It is contemplated that some of the apparatus shown may be eliminated without departing from the invention. Likewise, additional apparatus may be added to the elements shown without departing from the invention. Turning now to the elements of a device 398, one or more processors 300 serve as a central processing unit to oversee operation of the device and execute software code. Processors 300 capable of executing software code and interfacing with other electronic apparatus and memory are known in the art and accordingly are not described in great detail herein. The processor may comprise any processing unit capable of processing data and facilitating network communication. In one embodiment the processor 300 comprises an AMD brand K6-2 processor. In another embodiment the processor comprises an Intel brand Pentium processor. Memory 302 is associated with the processor 300. A monitor or display device 304 and a user interface 306 are also in communication with the processor 300. As is commonly understood, the display 304 provides a means to exhibit the results of the processor operation or any output resulting from the execution of software code. Likewise, the user interface 306 provides means to obtain input from a user to control or aid the operation of the processor 300 and software code running on the device 398. The monitor or display 304 may comprise a CRT display, plasma screen, LCD display or any other electronic device. The user interface 306 may comprise one or more buttons, keys, a mouse, touch pad, touch screen, lever or any device capable of receiving human input. If the device 398 is configured as a host device, the monitor 304 exhibits host or location operation data during operation and the user interface 306 provides means for a user to control network game operation.

Also included in the device 398 may be a mass storage media or fixed media 312, a removable media reader 310, and a secure memory 308. These apparatus operate in conjunction with the processor 300 to store and execute software that at least in part controls the device 398 and location system. In one embodiment the secure memory 308 comprises one or more memory devices configured to store software code that initiates or boots operation of the device 398 and to store software code for use by the processor to perform gaming machine location tracking.

One type of secure memory comprises a read only memory. Apparatus other than read only memory (ROM) may be utilized as secure memory 308. The term data, software, applications, programs and the like are used herein to mean any computer readable data or executable programs. Examples include CD, DVD, Read-only hard drives, flash memory, tape drives and RAM.

Also shown is a transceiver interface 330 configured interface data communications from the transceivers to the processor 300 and memory 302, 308, 310, 312. In one embodiment the transceiver interface 330 receives data signals from the transceivers such as the time of signal transmission while the time of receipt is provided to the host via a network interface 334. The information provided by the one or more transceivers is then processed by the processor in conjunction with software configured to execute processing instructions to yield a location of each gaming machine or other device in the casino.

Figure 4:
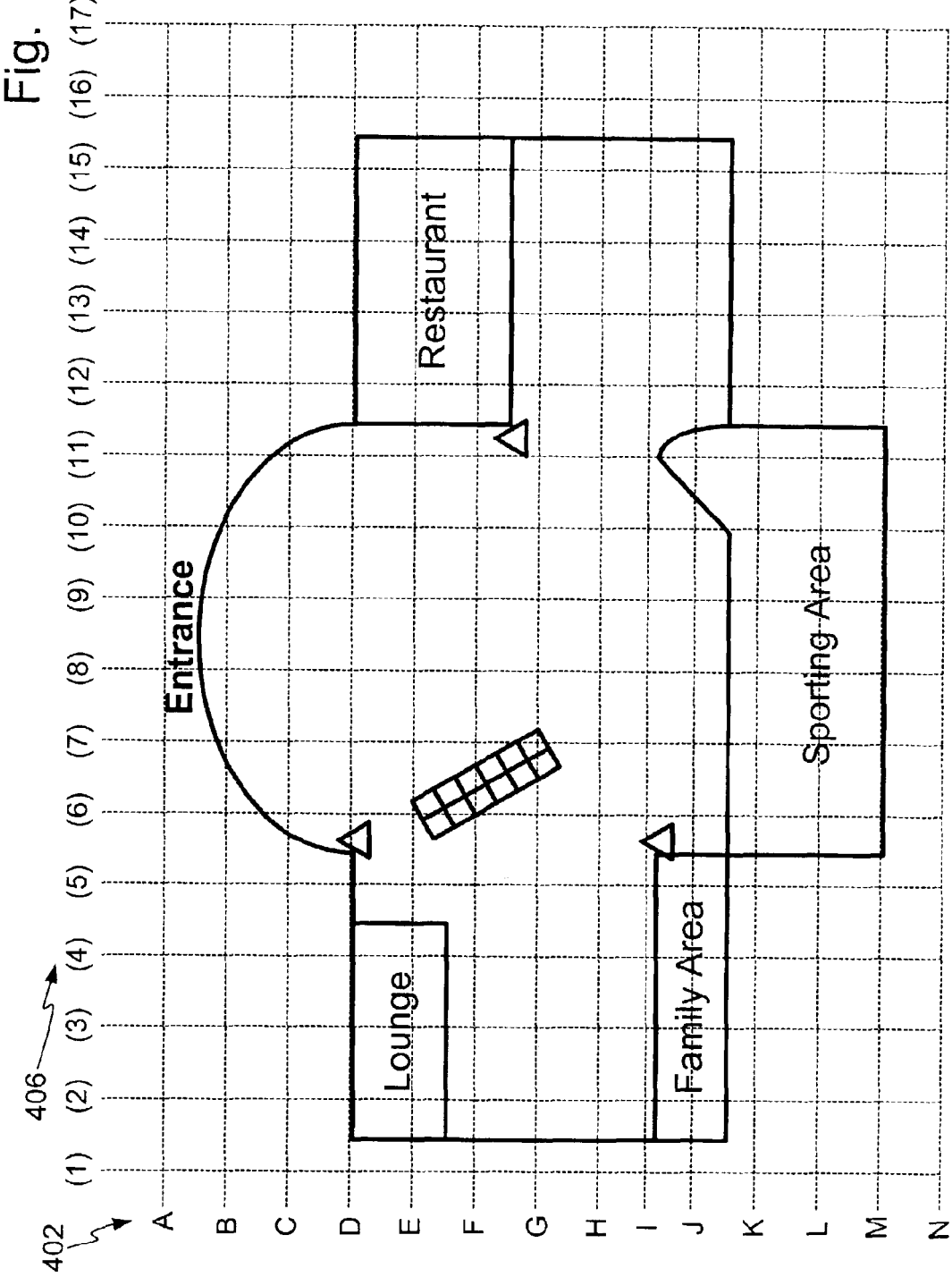
FIG. 4 illustrates an example of a grid system over an example environment of a casino.

It is further contemplated that a graphical representation of the casino floor, other area or a building may be overlaid with a grid or other mapping to provide a grid or quadrant system for identifying a gaming machine and mapping the casino floor. As shown in FIG. 4, a grid system having reference or grid lines traced across the casino. A set of horizontal lines 402 provides an alpha identifier while a set of vertical lines 406 provides a numeric identifier. Any level of resolution may be provided using the grid system as is desired by those implementing the method and apparatus described herein. Using the alpha numeric identifier the location of the gaming machine may be identified by an intersection of an intersection of an alpha line and a numerical line. By way of example, gaming machine 200 is at location G7. It is further contemplated that many advantages described and claimed herein may be implemented in conjunction with a manual entry of location data for the gaming machine. In many instances manual entry may be less costly than the automatic location monitoring systems. In one embodiment implementing the manual entry technique gaming machine identification data would be entered into a database or computer accessible model. Thereafter, location based machine control can occur as described herein.

Figure 5:
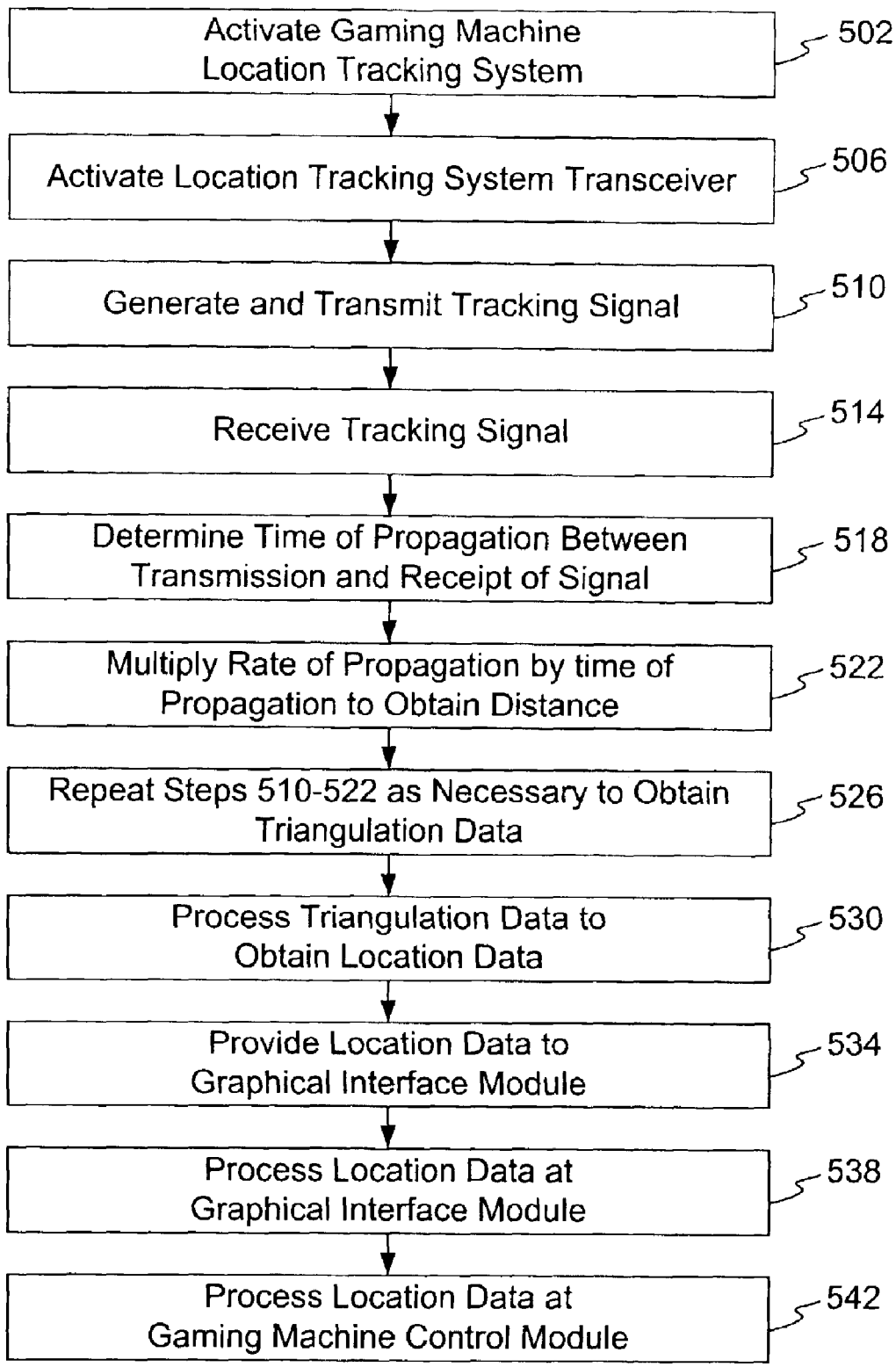
FIG. 5 illustrates an operational flow diagram of an example method of operation.

FIG. 5 illustrates an operational flow diagram of an example method of operation of a triangulation system to determine location of a gaming machine or other device. This is but one example method of operation. Other methods of operation may be implemented by those of ordinary skill in the art without departing from the scope of the invention as explained herein. At a step 502 the gaming machine tracking location system is activated. This may comprise activating the tracking aspects of the gaming machine in the event such aspects may be disabled. At step 506 the transceivers are activated. This may include the host computer system and associated software modules.

Next, at a step 510 the transceiver may generate and transmit the tracking signal. The gaming machine receives the signal at a step 514. After receipt of the signal data regarding the time of transmission and the time of receipt is provided to the host or other computing device. At a step 518 the host or other computing device processes the time data to determine the time of propagation. The time of propagation is the duration for the signal to travel from the transmitter to the receiver. Thereafter, at a step 522, the host or other processing device multiplies the rate of propagation by the time of propagation calculated at step 518 to determine triangulation data. The triangulation data may comprise a distance value representing the distance between the transmitter and the receiver.

At a step 526 the host or other processing device and the other tracking apparatus may repeat steps 502–522 for the same gaming machine to obtain improved accuracy or to average the triangulation information over numerous cycles. Likewise, the process may be repeated for other gaming machines. At a step 530, the host or other processing device processes the triangulation data to obtain location data. It is often necessary to obtain triangulation data from three sources to obtain a fix on a particular machine.

At a step 534 the host or other processing device optionally provides the location data to a graphical interface module, while at a step 538 the host or other processing device provides the location data to a gaming machine control module. In one embodiment the graphical interface module comprises a software module configured to map the location of the casino floor as a graphic and map the location of the gaming devices on to the graphic of the casino floor. This provides a useful interface for a user to monitor, track and layout gaming machines on a casino floor. It is contemplated that two or more reference points may be necessary to accurately align a graphical representation of the casino floor with the actual location of the gaming machines. With regard to the gaming machine control module, an example method of operation of a gaming machine control module is discussed below in conjunction with FIG. 6.

Figure 6:
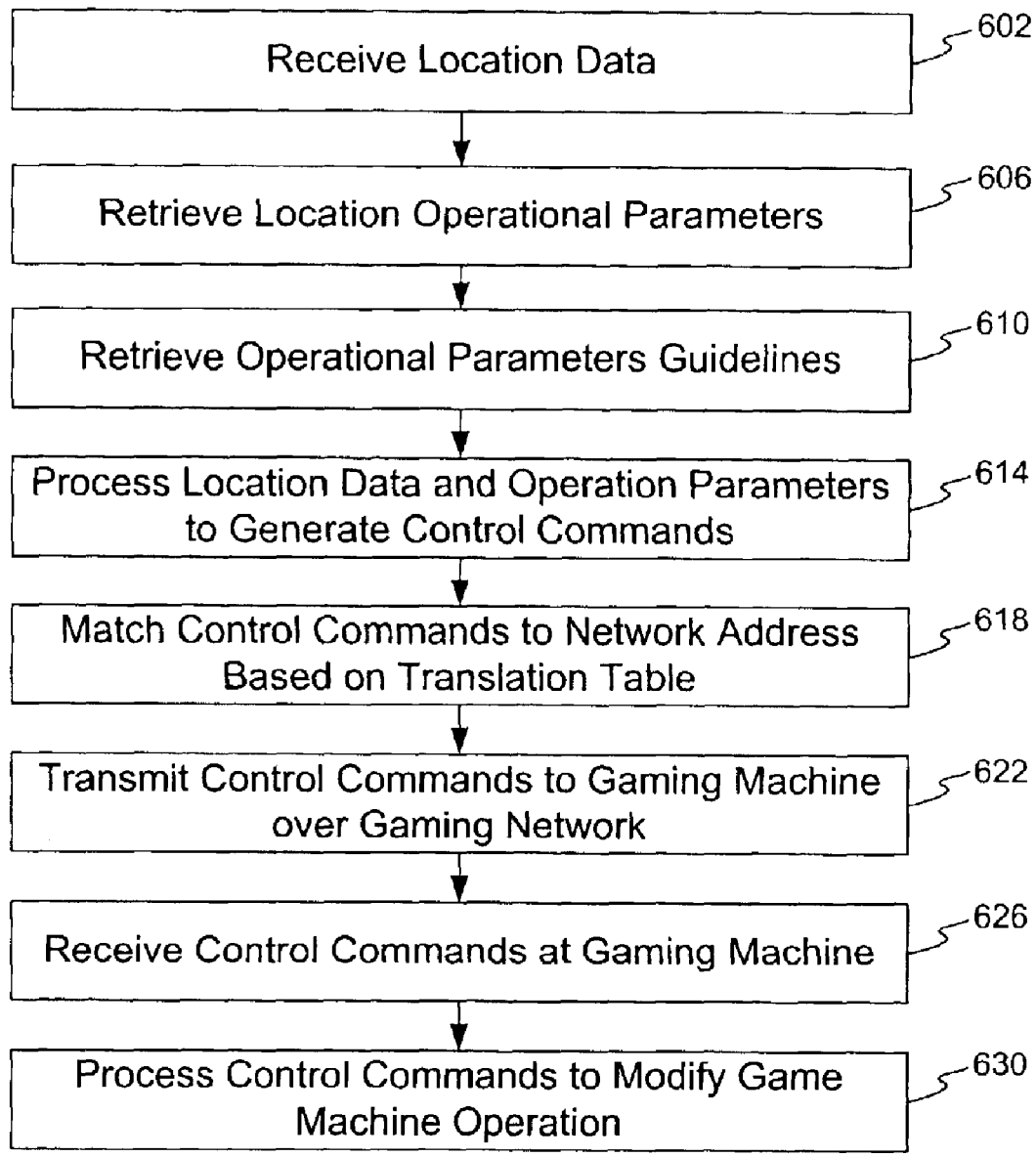
FIG. 6 illustrates an operational flow diagram of an example method of gaming machine control.

FIG. 6 illustrates an operation flow diagram of an example method of operation of a gaming machine control module. It is contemplated that this is but one possible method of operation for controlling a gaming machine. The gaming machine control module may be made to control operation of one or more gaming machines based on the location data and/or in combination with the time or date data. As discussed below, location data provides numerous advantages when used in conjunction with control data.

In reference to FIG. 6, at a step 602 the machine control module receives the location data from another system or module, such as a tracking system. At a step 606 the machine control module retrieves location operational parameters. In one embodiment the location operational parameters define rules, instruction, or guidelines that govern machine operation based on location of the machine. The location operational parameters may control factors including but not limited to enable/disable machine operation, sound volume, sound timing, video timing, sound/video selections, game denomination, payout rates, winning event actions, machine synchronization time of day, time of year, month or week, event center activities or other promotions, network identification, game selection, theme, maximum bet, minimum bet, payout rates, and payout limit. At a step 610 the machine control module retrieves operational parameter guidelines. The operational parameter guidelines define rules, instruction, or guidelines that govern gaming machine operation based on factors other than gaming machine location. The operational parameter guidelines may control factors including but not limited to payout limit, cash in limit, game selector, game or machine theme, max bet, minimum bet, time of operation, selector, and manner of operation.

At a step 614 the machine control module processes the location data and operational parameters to generate control commands. The control commands comprise messages or other control data that is to be provided to a gaming machine to control operational characteristics of the gaming machine. The control commands are created based on one or more of the above described factors. For example, if a gaming machine is located near a bar or lounge and the time of day and date is at the time of a football Superbowl event, then the sound of the gaming machines may be adjusted accordingly or set to coincide with commercials or halftime.

At a step 618 the control commands are matched to a network address. A translation table is one example system or device that may be used to match a control command, which may be location specific, to a network address. It may be desirable to match the control command with a network address so that at a step 622 the control commands may be transmitted to a particular gaming machine over the gaming network. The following table provides an example translation table with exemplary data. The address may be based on a TCP/IP protocol or any other networking standard or protocol. In one embodiment the machines is assigned a network address once the machine is located or identified.

| Gaming Machine ID # | Gaming Machine Network Address | Gaming Machine Location Data |
|---|---|---|
| 1938 | 5 | $1.00 denomination |
| 405 | 10 | $0.25 denomination |
| 2496 | 10 | 25 coin max bet |
| 1922 | 10.10.100.23 | Game is Keno |

At a step 626 the gaming machine receives the control commands based on the network address and at a step 630 the gaming machine modifies its operation based on the control instructions.

The method and apparatus described herein enables numerous features or advantages alone and in combination with other systems, software, or methods. Some of these features or advantages are described below in conjunction with associated systems and methods. These new features or advantages may be implemented alone or in any combination. By controlling gaming machine behavior based on location data the time consuming and expensive step of manual configuration of a gaming machine by opening the machine, manually entering control code to modify each game operation, and closing each machine, can be eliminated.

In one embodiment a uniform or synchronized gaming machine control scheme may be implemented. In such an embodiment a synchronization software module or other synchronizing control module determines which gaming machines are located within a defined area or with a maximum or minimum proximity. It is contemplated that such location parameters may be automatically determined by the synchronization module or input by a user. The synchronization module, based on the location of the gaming machines, controls various aspects of gaming machines operation. In one embodiment the gaming machines may be made to synchronize or coordinate sound effects or music, or lyrics. In one embodiment the coordination is based on a reference machine. In one embodiment the gaming machines are made to synchronize or coordinate video play, or brightness levels. This provides the advantage of having consistent and uniform game and video play as compared to the undesirable situation created in prior art systems in which music or sounds overlapping each other to combine into a incomprehensible drone. Likewise, this also provides the advantage of a continuous row of gaming machines screens each appearing uniform to create a row of uniform video play. It is likely this will be more captivating to a potential player. By way of example, it is envisioned that banks of gaming machines, that may be automatically located based on the location data, may be made to play the same sound and video, at the same time i.e. synchronously. Similarly, to generate further excitement on the casino floor or for a particular game, the banks or rows could dual back and forth with alternating sound and video. Locations data enables such operation.

In one embodiment the method and apparatus described herein is configured to monitor the location of gaming machines in comparison to other locations or areas of the casino. For example, a gaming machine monitoring system, which may embodied in software and utilized the gaming machine location data, may compare the location of gaming machines to a minimum or maximum location from an area of the casino. An advantage of such a system is that it provides an rapid or automatic method and apparatus to monitor machine location in comparison to to other areas of the casino without having to physically measure such distances. For example, if the rules of a particular jurisdiction prohibit a gaming machine from being located within a certain distance from a particular area, such as a family area, the monitoring system can be configured to automatically monitor the location between a family area and the gaming machines. Game play may also be suspended in certain areas or locations after a certain time of day or on Sundays based on current regulations. An alarm or notice system may be included to notify the casino personnel when the casino is not in compliance.

In one embodiment the location and tracking system is configured with a control module. The control module may operate with or utilized other data, such as time of day data, time of year or month data, or data about certain events. For example, based on the location of a machine the sound level of a machine may be controlled or modified. Machines near a bar or lounge may be may be detected as being near a bar or lounge and may be made to be silent during a sporting event or other promotion. Likewise, gaming machines located near an exclusive restaurant may be made to be quite so as to not disturb the diners. Thus, even with the continual relocation of gaming machines around the casino floor, the machines put near or in certain locations can be automatically configured by the location tracking system to automatically assume various operational characteristics.

In one embodiment the gaming machines located in a certain area may be made to operate in a particular manner based on their location. For example machines in a slot tournament may all be configured to partake in the slot tournament operation simply based on their location. Thus, slot tournament machines may be rapidly configured. Gaming machines located near a high roller sporting event or other activities area may be made to have higher play denominations simply based on their location. Similarly, pay out tables, games offered for play, and screen promotions may be offered to suit the needs of the casino or gaming environment. In one embodiment, games located near a retail sales area or restaurant may be made to intermittently promote those areas on the screen during periods when the machine is not in play. By way of example, games located in a certain area of the casino, such as near an Italian restaurant, may be made to assume an Italian theme, controlled to download a particular software. Not only could a theme be assigned based on the location of a machine, but location based advertising may also be implemented.

In another embodiment the location of the gaming machine may control which software is downloaded to the gaming machine. For example, gaming machines located in a particular location in a casino may have a particular software installed. The software may vary the type of game or the promotions which are displayed on the machine. In one situation it may be desired to load a particular type of software a r data to machines located within a distance of a casino entrance. Using the machine location system described herein the location of the various machines may be determined. Once determined, conversion can be done to determine the network address of the machines. Thereafter, the software may be sent to the desired machines based on the addresses.

In one embodiment the game may be controlled to offer a particular progressive system or to offer participation in a progressive system. In such an embodiment the machines within a certain location or selected based in some form on their location are selected for participation in the progressive, such as a linked progressive. Once located, the location data may be translated to network or other address information and the gaming machines linked into the progressive system. Such a system provides greater flexibility and greater efficiently when linking machines into a progressive system. Progressive system information, such as payout amount, may be downloaded to the machines, based on the machine location or inclusion in a machine bank.

In one embodiment the location data is utilized for marketing and business purposes. The location data along with machine usage data may be used to determine preferred machine configurations and locations. As an advantage to the invention the data may be collected automatically or in real time as a machine is moved to different locations in the casino. Moreover, the gaming location is known and provided automatically so that reports may easily be generated. By way of example, two identical machines may be placed in different locations in the casino and provided to patrons for game play. After a period of time the amount of play may be compared to determine desirable locations. Likewise, the location tracking system in conjunction with other information may be used to determine the most popular machines themes for particular locations in the casino. On a broader scale, machine play may be compared between different casinos.

In a variation of this embodiment collection meter data may be combined with location data to provide another level of detail regarding the play occurring on a gaming machine and play in a particular location in the casino. Through the use of location data in combination with collection meters the location of a machine may be tracked in combination with amount of play, type of game in use on the machine, theme of the machine, video on the machine, volume and audio selection for the machine. In yet another embodiment player tracking data may be combined with the location data and collection meter data to add yet another level of detail to player information. By way of example and not limitation, through the use of the gaming machine location system it can be determined that a particular age group of player (obtained from player tracking data) prefers to play a particular type of game when the gaming machine is located in a particular location within the casino. Marketing and casino layout may thereby be adjusted accordingly to improve game play and collection.

In one embodiment the location data and a machine control module may be made to control gaming machine behavior based on a winning event of a co-located machine. A co-located machine is a machine located within a user defined distance of a winning machine or within a bank of machines. Control of one or more other gaming machines based on a winning event at one or more other machines provides numerous advantages. The winning machine may be regarded as the reference machine from which other machines may react. It is contemplated that other events may cause a game to become a reference machine and thereby cause nearby or other machines to initiate activity.

It is often desirable to generate attention to a winning event. By generating attention for a winning event it is more likely that other patrons will initiate gaming or will assume the impression that the casino has a generous payout scheme. Thus, in one embodiment the control systems cause machines co-located with a winning machine to generate noise, video, or other attention grabbing action to alert other patrons of the near by win. This will likely draw patrons to play the machines near the winning machine. This is particularly desirable since machines of the company offering such systems will be played more often and thus generate more revenue for the casino.

In one embodiment the location and tracking system may be used to implement a more interactive and dynamic game play between different players. Based on a location of a machine, the game play can be made to occur interactively between two or more players. For example, the invention may enable two or more players want to gamble in an interactive game, such as a common game in which players participate against each other for a common payout, they may select several gaming machines and enter data. The machines may be consecutively located to provide personal interaction, or located remote. In one example method of operation, the players may select which players to play against by designating or requesting to the gaming machine to play against the player to my right or left. This is a desirably simple input for the player. Because the location and tracking system is aware of the location of each game, it can cause interactive game play to occur between two or more machines. Machine location to address translation tables may be used to match a game location to a network address thus facilitating interactive play. In the event the machines are not consecutively located, a player may input data regarding a name or machine ID or other code to designate which machine to include in the interactive game play.

It is further contemplated that interactive play may occur between individuals at different properties. In one embodiment the gaming machines communicate via a communication link, such as a computer network, and in conjunction with host systems and the locating systems described herein, the location of the gaming machines are determined. Based on the location of each gaming machine and player input, players may locate or request play against other players. Players may be located or identified based on player tracking systems or other club or membership basis. Interactive messages may be provided to players to facilitate the interactive play. In one configuration, custom slot tournaments may be enabled by a two or more players that utilize the interactive play options. As a result of the machine location system players need not be at the same property. In one embodiment an area of the casino or a bank of machines are enabled as interactive play machines.

In yet another embodiment the location data is utilized by player tracking systems to collected data regarding player preferences regarding play locations and to locate players in real time during play. In such an embodiment the location data may be used in conjunction with a player tracking system. Co-pending patent application Ser. No. 09/544,884 filed on Apr. 7, 2000 describes such a system. An example of a popular player tracking system is the EZ-Pay® player tracking system available from International Game Technology located in Reno, Nev. By providing a player tracking module to the machine tracking location system, the location data may be used to locate a machine at which a particular player is playing. For example, if a valued player is currently playing, the player tracking data will identify which machine the valuable player is currently playing. Using the location data, the machine can be located and hence the player at the machine can be located and contacted. This may be useful to locate a player in case of an emergency, provide bonus awards or complementary gifts to a player or prevent theft or fraud. In one configuration a wireless device or handheld portable device may be used by a casino personnel to obtain location information while on the floor of the casino. In one embodiment the player tracking system is able to translate the machine location data into direction information to guide casino personnel to the player.

In another embodiment the location data may be used by casino personal or other individual to aid in casino operations. By way of example the location data may be provided via any means including cell phone, PDA, laptop computer, kiosk, computer network, location beacon, over a wired or wireless channel. Once the location data is provided, the location data may be used to locate a malfunctioning machine, such as for repair or other reason, used by servers to provide beverages or other services, to provide awards, complementary services, or in case of emergency. In one embodiment the location data may be used for security purposes. For example, if the host detects one or more fraud attempts at a particular machine, then security personnel may be dispatched to watched the player and the machine.

It will be understood that the above described arrangements of apparatus and the methods derived therefrom are merely illustrative of applications of the principles of this invention and many other embodiments and modifications may be made without departing from the spirit and scope of the invention as defined in the claims.

I claim:

1. A method for locating a gaming machine on a casino floor comprising:

transmitting a first signal at a first time from a first transmitter;

transmitting a second signal at a second time from a second transmitter;

transmitting a third signal at a third time from a third transmitter;

receiving the first signal at a fourth time with a receiver;

receiving the second signal at a fifth time with the receiver;

receiving the third signal at a sixth time with the receiver;

calculating the time difference between the first time and the fourth time, the second time and the fifth time, and the third time and the sixth time;

calculating a distance between the receiver and the first transmitter to determine a first distance, a distance between the receiver and the second transmitter to determine a second distance, and a distance between the receiver and the third transmitter to calculate a third distance;

calculating the location of the gaming machine based on an intersection point of at least the first distance, the second distance and the third distance;

generating a graphical map of the casino floor; and indicating the location of the gaming machine on the graphical map of the casino floor.

2. A method of claim 1, wherein the receiver is located on the gaming machine.

3. A method of claim 1, wherein calculating a distance comprises multiplying a rate of propagation for a signal by the time between transmitting and receiving.

4. A method for locating a gaming machine on a casino floor comprising:

transmitting a first signal at a first time from a transmitter;

transmitting a second signal at a second time from the transmitter;

transmitting a third signal at a third time from the transmitter;

receiving the first signal at a fourth time with a first receiver;

receiving the second signal at a firth time with a second receiver;

receiving the third signal at a sixth time with a third receiver;

calculating a time difference between the first time and the fourth time, the second time and the firth time, and the third time and the sixth time;

calculating a distance between the first receiver and the transmitter to determine a first distance, a distance between the second receiver and the transmitter to determine a second distance, and a distance between the third receiver and the transmitter to calculate a third distance;

calculating the location of the gaming machine based on an intersection point of at least the first distance, the second distance, and the third distance;

generating a graphical map of the casino floor; and indicating the location of the gaming machine on the graphical map of the casino floor.

5. The method of claim 4, wherein the transmitter is located on the gaming machine.

6. The method of claim 4, wherein the calculating a distance comprises multiplying a rate of propagation for a signal by the time between transmitting and receiving.

7. A method for locating a gaming machine on a casino floor comprising:

receiving one or more signals from a tracking device, the tracking device being located on a gaming machine;

processing the one or more signals from the tracking device to determine location data regarding the gaming machine;

processing the location data in relation to casino floor location information to thereby determine the location of the gaming machine on the casino floor;

generating a graphical map of the casino floor;

indicating the location of the gaming machine on the graphical map of the casino floor; and configuring operational parameters of the gaming machine based upon the indicated location of the gaming machine on the graphical map of the casino floor.

8. The method of claim 7, further including transmitting one or more signals from the tracking device located on the gaming machine.

9. The method of claim 7, wherein processing the one or more signals from the tracking device comprises processing signals received from at least three different receivers.

10. The method of claim 7, wherein the signal comprises an infrared type signal.

11. The method of claim 7, wherein the tracking device comprises a radio frequency identification tag.

12. The method of claim 7, further including generating a representation of the gaming machine on a graphical representation of the casino floor.

13. An apparatus for mapping a casino floor layout in a casino, the apparatus comprising:

one or more emitters located at one or more locations in the casino;

one or more detectors located at one or more locations in the casino, the detectors configured to detect the emitters;

a processor configured to receive and process data regarding the location of one or more of the emitters or one or more of the detectors in order to determine the location of one or more gaming machines on the casino floor layout, the processor also configured to generate a graphical map of the casino floor layout and to indicate the location of the one or more gaming machines on the graphical map; and a communication channel configured to facilitate communication between the one or more emitters and the processor or the one or more detectors and the processor.

14. An apparatus as recited in claim 13, wherein the one or more emitters generate infrared signals.

15. An apparatus as recited in claim 13, wherein the one or more detectors generate energy that causes the emitters to emit a signal.

16. An apparatus as recited in claim 13, further including a mapping module configured to execute on the processor, to provide a graphical representation of the location of the one or more emitters.

17. An apparatus as recited in claim 13, wherein the one or more emitters emit a radio frequency signal.

18. An apparatus as recited in claim 13, wherein the one or more emitters are further configured to communicate with the processor over a computer network.

19. A system for tracking a location of one or more gaming machines within a building comprising:

one or more transmitters associated with one or more gaming machines, the transmitters configured to transmit one or more signals;

one or more receivers located within the building and configured to receive the one or more signals at least one host computer in communication with the one or more receivers; and a storage medium containing machine readable code configured to execute on the at least one host computer, the machine readable code configured to process data from the one or more receivers to determine the location of the one or more gaming machines on a floor of the building, the machine readable code also configured to generate a graphical map of the floor and indicate the location of the one or more gaming machines on the graphical map of the floor; the machine readable code also configured to generate control commands for configuring operational parameters of the one or more gaming machines based upon the indicated location of the gaming machines on the graphical map of the floor within the building.

20. A system as recited in claim 19, wherein the one or more transmitters comprise radio frequency identification tags.

21. A system as recited in claim 19, wherein the one or more receivers and at least one host computer communicate over a computer network.

22. A system as recited in claim 19, further including machine readable code configured to monitor the location of the one or more gaming machines in relation to various aspects of the building.

23. A system as recited in claim 19, wherein each of the one or more signals generated by the one or more transmitters includes a unique code.

24. The method as recited in claim 1 further comprising:

locating at least two reference points on the casino floor; and aligning the graphical map of the casino floor with the at least two reference points, wherein the location of the gaming machine can be accurately indicated with respect to the graphical map.

25. The method as recited in claim 4 further comprising:

locating at least two reference points on the casino floor; and aligning the graphical map of the casino floor with the at least two reference points, wherein the location of the gaming machine can be accurately indicated with respect to the graphical map.

26. A system as recited in claim 13 wherein the processor is further configured to locate at least two reference points within the casino and to align the graphical map of the casino floor layout with the at least two reference points, wherein the location of the one or more gaming machines can be accurately indicated with respect to the graphical map.

27. A method as recited in claim 7 further comprising:

receiving location operational parameters at a gaming machine control module, the location operational parameters defining rules that govern the operational parameters of the gaming machine based upon the location of the gaming machine on the casino floor.

28. A method as recited in claim 27 wherein the location operational parameters define rules pertaining to at least one of enabling and disabling gaming machine operation, game selection, and payout rates.

29. A method as recited in claim 27 further comprising:

generating control commands based at least in part upon the location operational parameters; and transmitting the control commands to the gaming machine over a communication network wherein the control commands are used to configure the operational parameters of the gaming machine.

30. A method as recited in claim 7 further comprising:

downloading a software update to the gaming machine if the gaming machine is located in a certain area of the casino floor.

31. A method as recited in claim 7 further comprising:

determining if the gaming machine is located within a gaming machine prohibited area; and generating a warning notification that indicates that the gaming machine is not in compliance with certain gaming regulations.

32. A method as recited in claim 7 wherein the gaming machine is one of a plurality of gaming machines, the method further comprising:

synchronizing at least two of the gaming machines that are located proximate to each other by configuring the at least two gaming machines to have substantially similar operational parameters.

33. A method as recited in claim 7 wherein the gaming machine is one of a plurality of gaming machines, the method further comprising:

detecting when a first gaming machine experiences a winning event; and configuring the operational parameters of a second gaming machine, which is located proximate to the first gaming machine, such that the second gaming machine generates certain sounds and video displays, whereby the certain sounds and video displays emphasize the winning event of the first gaming machine to patrons on the casino floor.

34. A system as recited in claim 19 wherein the storage medium further comprises:

location operational parameters that govern the operational parameters of the one or more gaming machines based upon the location of the gaming machines within the building.

35. A system as recited in claim 34 wherein the location operational parameters pertain to at least one of enabling and disabling gaming machine operation, game selection, and payout rates.

36. A system as recited in claim 19 further comprising:

a communication network suitable for transmitting the control commands to the one or more gaming machines.

* * * * *